Patented Oct. 16, 1923.

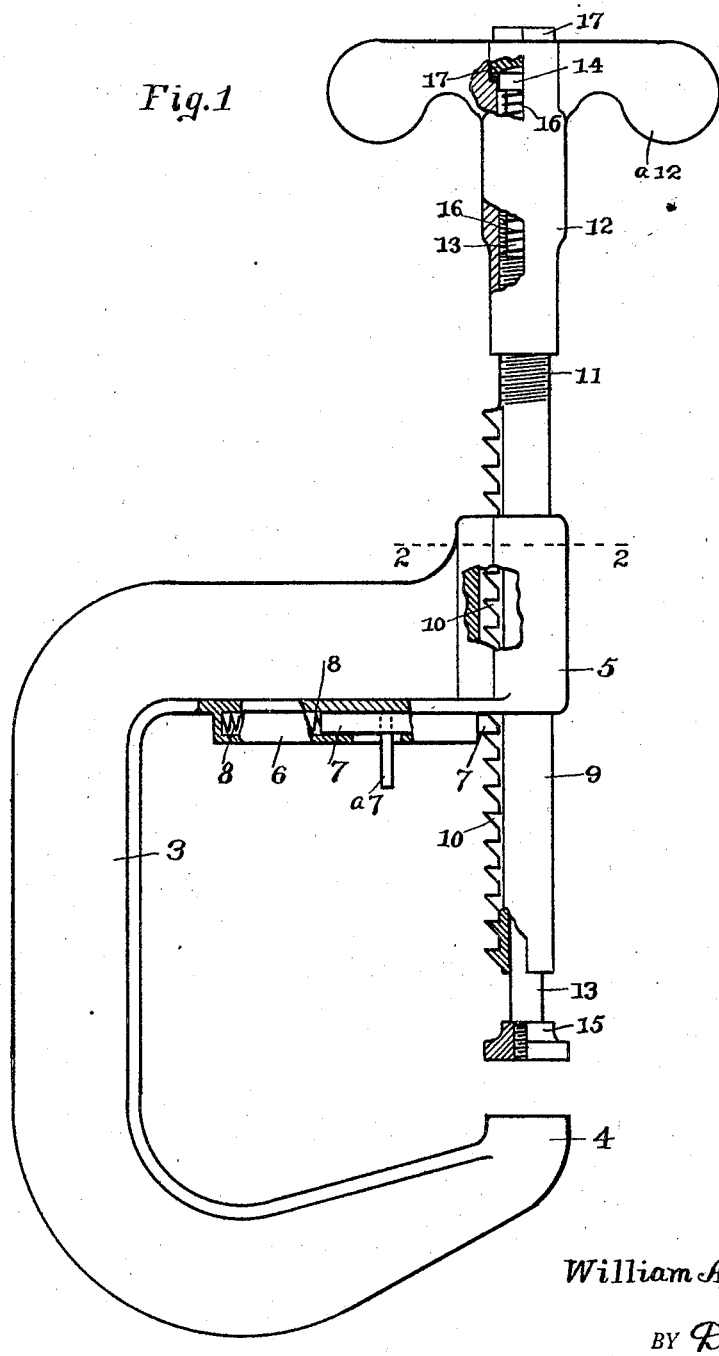

1,470,706

UNITED STATES PATENT OFFICE.

WILLIAM A. DAY, OF BELLINGHAM, WASHINGTON, ASSIGNOR OF ONE-HALF TO HARRY V. SALTZGABER, OF BELLINGHAM, WASHINGTON.

HAND CLAMP.

Application filed February 8, 1923. Serial No. 617,667.

*To all whom it may concern:*

Be it known that I, WILLIAM A. DAY, a citizen of the United States, and a resident of Bellingham, in the county of Whatcom and State of Washington, have invented a new and useful Hand Clamp, of which the following is a specification.

My invention relates to improvements in hand clamps, and one of the objects of my improvements is to provide a hand clamp in which the press rod is not turned by the operation of setting the clamp, another object of my improvement is to provide a hand clamp having a beveled-tooth rack independent of the setting screw, and a further object of my improvement is to provide a hand clamp having a finely threaded setting screw.

I attain these objects with the mechanism illustrated in the accompanying sheet of drawings, which form a part of this specification, and in which Figure 1 is a side elevation of my hand clamp and Fig. 2 is a plan view of the upper jaw of the clamp in section on the line 2—2.

Similar characters refer to similar parts throughout, and certain parts are broken away in order to show other parts hidden thereby.

More particularly: A U-form clamp 3 has lower jaw 4 and upper jaw 5. Pawl housing 6 is fastened to the lower side of the upper arm of the clamp and in it pawl 7 can reciprocate. Pawl pin $a^7$ is fixed in said pawl and protrudes downward through a slot in said housing within reach of a finger of the operator. A spring 8 reacts between the closed end of housing 6 and the inner end of pawl 7 and tends to protract said pawl. Jaw 5 has a hole therethrough the projected center line of which would pass through the center of jaw 4. In this hole is mounted rack rod 9 having toothed rack 10 on the side next the clamp frame. The upper sides of rack teeth 10 are preferably normal to the longitudinal axis of rod 9. Rack 10 is adapted for engagement by pawl 7 the upper surface of the bit of which is beveled to fit with the lower side of teeth 10 and the lower side of said bit engages with and bears on the upper side of teeth 10. Thus downward pressure on rack rod 9 forces pawl 7 to retract against spring 8 and permit teeth 10 to pass downward, but it will engage with said teeth to prevent upward movement of said rack rod till pawl 7 is withdrawn by pressure on finger pin $a^7$. Teeth 10 do not extend to the upper end of rod 9 and said upper end is cylindrical and provided with a fine screw thread 11. The lower end of a long nut 12 is threaded to engage with the threaded body 11 and has wings $a^{12}$ on its upper end. Rack rod 9 is hollow from end to end and in it is mounted press rod 13 for reciprocation. On the upper end of rod 13 is a circular, crowned head 14, and on its lower end is screwed foot disc 15. A helical spring 16 is mounted on rod 13 beneath its head to react between the upper end of rack rod 9 and said head. Screw plug 17 is engaged in the upper end of nut 12 and has a concave lower end to seat rod head 14. Spring 16 causes said head to maintain its illustrated position bearing against plug 17.

In use, pawl 7 is withdrawn from engagement with teeth 10 by pressure from a finger on pin $a^7$ and rod 9, accompanied by rod 13, are raised or withdrawn through the hole in the jaw 5 till the work can pass between jaw 4 and foot disc 15. Then jaw 4 is held against the lower side of the work while pressure downward on wings $a^{12}$ forces foot disc 15 to bear on the upper surface of the work. When the clamp is thus in place on the work a few turns of wings $a^{12}$ will press foot 15 firmly against the work and tightly clamp the same with screw pressure from fine screw threads 11. In applying this screw pressure foot disc 15 is not revolved on the work because its friction therewith exceeds the friction between press-rod head 14 and plug 17, and the surfaces of these two members move easily on each other.

To release the clamp, a few backward turns of wings $a^{12}$ relieves the pressure on the pawl 7 and it is withdrawn from engagement with teeth 10 and press rod 13 and rack rod 9 are simultaneously drawn away from the work by hand pressure beneath wings $a^{12}$, when the work can be removed from the clamp, or, as is more usual, the clamp can be withdrawn from the work.

This clamp is especially designed for use on metal work. The ordinary metal carpenter's clamp, because of its necessarily coarse thread, which serves the purpose of a rack also, is not powerful enough for metal work. The usual metal-worker's clamp is a simple screw device. My clamp provides the power of a fine screw thread with the quick action of the rack and pawl without introducing the loose construction of the well-known metal carpenter's hand clamp.

Having thus disclosed my invention, what I claim as new and desire to secure by Letters Patent is,—

1. In a hand clamp in combination, a clamp body having a lower jaw adapted to bear on the lower side of the work and an upper jaw having a hole therethrough the axis of which intersects said lower jaw adapted to mount a rack rod for reciprocation, a hollow rack rod mounted for reciprocation in said jaw hole having a toothed rack and a threaded upper body, a pawl mounted on said clamp body adapted to engage with said rack whereby said rack rod is retained from reciprocating in said jaw hole, a press rod mounted for reciprocation in said rack rod protruding from both ends of said rack rod and having a head on its upper end, a helical spring mounted on said press rod between its head and the upper end of said rack rod whereby said press rod is caused to bear on a wing nut, a wing nut engaged on the said threaded body of said rack rod adapted to bear on said press rod head whereby when said wing nut is screwed on said rack rod said press rod is forced toward said lower jaw against the pressure of said spring.

2. In a hand clamp in combination, a clamp body having a lower jaw adapted to bear on the lower side of the work, and an upper jaw having a hole therethrough in line with said lower jaw, a hollow rack rod mounted for reciprocation in said jaw hole having teeth beveled on their lower side and normal to said rod on their upper side, a pawl reciprocal in a housing on said jaw body having a bit beveled on its upper side and normal on its lower side engageable with the teeth of said rack, a spring in said pawl housing reacting between said housing and the outer end of said pawl whereby said pawl is forced to engage with said teeth, a press rod mounted for reciprocation in said rack rod with its ends protruding therebeyond having a foot disc on its lower end and a head on its upper end, a helical spring mounted on said press rod adapted to react between the head thereof and the upper end of said rack rod, a wing nut screwed on the upper end of said rack rod, and a screw plug in the upper end of said wing nut adapted to bear on said press-rod head whereby said rack rod can be forced downward against the holding power of said pawl to cause said foot disc to bear on the upper side of the work and said press rod can be forced further downward to cause said foot disc to bear harder on said work by screwing said wing nut down on said rack rod.

WILLIAM A. DAY.